(12) United States Patent
Hasegawa et al.

(10) Patent No.: US 8,866,580 B2
(45) Date of Patent: Oct. 21, 2014

(54) POWER CONVERTING APPARATUS

(75) Inventors: Yuichi Hasegawa, Tokyo (JP);
Hiromune Ishii, Tokyo (JP); Yuki Satake, Tokyo (JP); Takeshi Kawahara, Tokyo (JP)

(73) Assignees: Shinto Holdings Co., Ltd. (JP); Nikkindenji Kogyo Co., Ltd. (JP)

( * ) Notice: Subject to any disclaimer, the term of this patent is extended or adjusted under 35 U.S.C. 154(b) by 264 days.

(21) Appl. No.: 13/470,270

(22) Filed: May 12, 2012

(65) Prior Publication Data

US 2013/0128622 A1    May 23, 2013

(30) Foreign Application Priority Data

May 13, 2011    (JP) ................. 2011-108205

(51) Int. Cl.
*H01F 27/24*    (2006.01)
*H01F 17/04*    (2006.01)
*H02M 7/42*    (2006.01)
*H02M 3/158*    (2006.01)
*H02M 3/335*    (2006.01)

(52) U.S. Cl.
CPC ............ *H02M 3/33569* (2013.01); *H02M 7/42* (2013.01); *H02M 3/1584* (2013.01)
USPC ............ 336/212; 336/182; 336/220; 336/221

(58) Field of Classification Search
USPC .................................. 336/212, 221, 182, 220
See application file for complete search history.

(56) References Cited

U.S. PATENT DOCUMENTS

| | | | |
|---|---|---|---|
| 3,270,308 A * | 8/1966 | Mittermaier | 336/217 |
| 4,953,286 A * | 9/1990 | Boenitz | 29/605 |
| 2004/0246089 A1* | 12/2004 | Stephens | 336/212 |
| 2007/0159284 A1* | 7/2007 | Chang | 336/180 |
| 2008/0012680 A1* | 1/2008 | Muelleman | 336/212 |
| 2008/0224812 A1* | 9/2008 | Chandrasekaran | 336/212 |
| 2009/0290388 A1* | 11/2009 | Kawasaki et al. | 363/21.1 |
| 2010/0171580 A1* | 7/2010 | Abe et al. | 336/178 |
| 2010/0245009 A1* | 9/2010 | Akiyama et al. | 336/175 |
| 2012/0081202 A1* | 4/2012 | Nanayakkara et al. | 336/200 |

FOREIGN PATENT DOCUMENTS

| | | |
|---|---|---|
| JP | 2002-010632 | 1/2002 |
| JP | 2010-226888 | 10/2010 |

* cited by examiner

*Primary Examiner* — Tsz Chan

(57) ABSTRACT

A power converting apparatus makes reduction of power loss possible and operates in a two-phase mode. A power converting apparatus of the inventive concept includes I-shaped block cores, each being made of a magnetic material; and E-shaped cores, each being produced by combining two L-shaped magnetic materials to each of the I-shaped cores. In each of the E-shaped cores, the block core is defined as a central leg, the other two legs are defined as a first outside leg and a second outside leg, respectively, and a closed magnetic path is configured by two E-shaped cores combined such that one of respective central legs in the two E-shaped cores, one of respective first outside legs therein, and one of respective second outside legs therein are caused to face the other of the central legs, the other of the first outside legs, and the other of the second outside legs.

5 Claims, 9 Drawing Sheets

POWER CONVERTING APPARATUS

CROSS-REFERENCE TO RELATED APPLICATION

This application claims the benefit of Japanese Patent Application No. 2011-108205, filed on May 13, 2011, which is hereby incorporated by reference in its entirety.

BACKGROUND

1. Technical Field

Embodiments of the inventive concept relate to a power converting apparatus which operates in a two-phase mode, and in particular to a power converting apparatus characterized by a shape of a core made of a magnetic material.

2. Description of the Related Art

Conventionally, in an electronic equipment product such as video and audio equipment or office automation (OA) information equipment, a circuit adopting a two-phase interleave system is known.

As one example, the circuit adopting a two-phase interleave system includes a plurality of boosting circuits connected in parallel to a DC current, each boosting circuit being composed of a boosting choke, a boosting diode, and a switching element. For example, technology related to a power converting apparatus operating in a two-phase mode where a smoothing capacitor is connected to an output side of the boosting circuit has been proposed. In addition, one approach includes connecting a load in parallel with the smoothing capacitor. Each switching element configuring a boosting circuit to be subjected to pulse-width modulation control by a control signal pulse supplied from a control circuit, or the like, has also been proposed.

Further, as one example of the shape of a core made of a magnetic material, a technology using an EC core has been proposed. For example, in a power converting apparatus, which operates in a two-phase mode, a shape of an EC core is produced by forming two E-shaped magnetic flux material portions (hereinafter called "E-shaped core members"), which can include c-shaped magnetic flux material portions (e.g., 20a, 20b, 20c, and 20d, hereinafter, called "c-shaped core members"), as shown in FIG. 1. The two E-shaped magnetic flux material portions are prepared to mutually face each other and can be coupled together. Surrounding the peripheries of the two E-shaped magnetic flux material portions are large C-shaped magnetic flux material parts (e.g., 25, hereinafter called "C-shaped core members"). In other words, the E-shaped core members and the C-shaped core members are combined to form the EC core.

In the EC core, however, gaps G such as shown in FIG. 1 are necessarily formed. Due to the gaps G, problems related to power loss of magnetic flux loss occurs. In the industry, in an apparatus using a power converting apparatus (e.g., such as a DC/DC converter, an inverter circuit, or the like), which are used in vehicles (e.g., hybrid vehicles, a product provided with a power motor, a heavy-duty construction site vehicle, a bulldozer, a loading shovel, a robot, or other electric equipments, or the like), there is a strong demand to reduce the size of the on-board power converting apparatus.

Further, since the above-described EC core is a core produced by combining the c-shaped core members 20a through 20d and surrounding the peripheries of the combined c-shaped core members 20a through 20d by the large C-shaped core members 25, a ratio of a sectional area Y1 of a central leg of the core, a sectional area Y2 of an outside leg Y2 (e.g, right side) of the core, and a sectional area Y3 of an outside leg (e.g., left side) of the core is 1:1:1, as shown in FIG. 2. Therefore, in such an EC core as described in FIG. 2, there is a problem in that the sectional areas of both the outside legs are excessively large, which cannot adapt to a demand for size reduction.

Therefore, in an apparatus using such a power converting apparatus, development of a power converting apparatus, which is compact and operates with reduced power loss would be desirable.

In view of these circumstances, it would be desirable to provide a power converting apparatus, which reduces power loss, has a small occupation area, is reduced in size, and has a core shape in which the manufacturing process is simplified.

SUMMARY

According to an aspect of the inventive concept, there is provided a power converting apparatus comprising a core made of a magnetic material and a winding wound at a predetermined position on the core to operate in a two-phase mode. The core may include: a plurality of I-shaped block cores, each being made of a magnetic material; and a plurality of E-shaped cores, each including or otherwise being produced by combining or coupling two L-shaped magnetic materials to each of the I-shaped block cores. In each of the E-shaped cores, the block core may be defined as a central leg, two outside legs including the two L-shaped magnetic materials may be defined as a first outside leg and a second outside leg, respectively, and the plurality of E-shaped cores are combined such that one of respective central legs in the plurality of E-shaped cores, one of respective first outside legs therein, and one of respective second outside legs therein are caused to face the other of the central legs, the other of the first outside legs, and the other of the second outside legs, respectively A closed magnetic path is configured by the first outside leg and the second outside leg opposed to the first outside leg relative to the central leg.

The "winding" is not limited to a line-shaped member but it may be a strip-shaped member. For example, a copper wire and/or a strip-shaped copper wire may be used.

In the power converting apparatus of the inventive concept, the ratio of the sectional area of the central leg, the sectional area of the first outside leg, and the sectional area of the second outside leg may be 2:1:1.

In the power converting apparatus of the inventive concept, the block core may be produced by stacking rectangular magnetic materials.

In the power converting apparatus of the inventive concept, the L-shaped magnetic materials may be produced or configured by cutting a rectangular cylindrical magnetic material part constituted by winding a strip-shaped magnetic material into four pieces, each having the same size and an L shape.

The power converting apparatus of the inventive concept may be a power converting apparatus for boosting an output voltage of a DC power source. The power converting apparatus may include at least two reactors, respective primary windings thereof being connected to a positive electrode of a positive power source of the DC power source; at least two switching elements, which are connected between the primary windings of the respective reactors and a negative electrode of the DC power source, respectively, and an inductor portion, which is connected between a secondary winding of a first reactor of the at least two reactors and a secondary winding of a second reactor thereof; at least two series circuits, each including a diode and a capacitor, which are connected between the respective primary windings of the at least two reactors and the negative electrode of the DC power source, respectively. The secondary windings of the at least two reactors and the inductor portion may be connected in series so as to form a closed loop. The capacitor included in the at least two series circuits corresponds to a single shared smoothing capacitor. And the core includes at least two outside legs on which the primary windings of the at least two reactors are wound, and the core includes the central legs.

In the power converting apparatus of the inventive concept, the windings may have the same number of turns.

The power converting apparatus of the inventive concept may be a DC/DC converter.

The power converting apparatus of the inventive concept may be a driver circuit for motor driving.

Further, the power converting apparatus of the inventive concept may be an inverter circuit. Further, the power converting apparatus of the inventive concept may be one mounted on at least one of an electric vehicle, a loading shovel, a bulldozer, a robot, a solar generator, an engine driven generator, a large capacity power source, and/or a medical equipment, or the like.

According to the power converting apparatus of the inventive concept, since the core includes: I-shaped block cores, each being made of magnetic material; and E-shaped cores, each being produced by combining two L-shaped magnetic materials to each of the I-shaped cores, wherein, in each of the E-shaped cores, the block core is defined as a central leg, the other two legs are defined as a first outside leg and a second outside leg, respectively, and two E-shaped cores are combined such that one of respective central legs in the two E-shaped cores, one of respective first outside legs therein, and one of respective second outside legs therein are caused to face the other of the central legs, the other of the first outside legs, and the other of the second outside legs, respectively, and a closed magnetic path is configured by the first outside leg and the second outside leg opposed to the first outside leg relative to the central leg, a power converting apparatus according to embodiments of the inventive concept has reduced power loss, has a small occupation area, can be reduced in size, and has a core shape whose manufacturing process is made simple.

DETAILED DESCRIPTION OF THE PREFERRED EMBODIMENTS

A power converting apparatus according to an embodiment of the inventive concept will be described with reference to the drawings.

Figure 3:
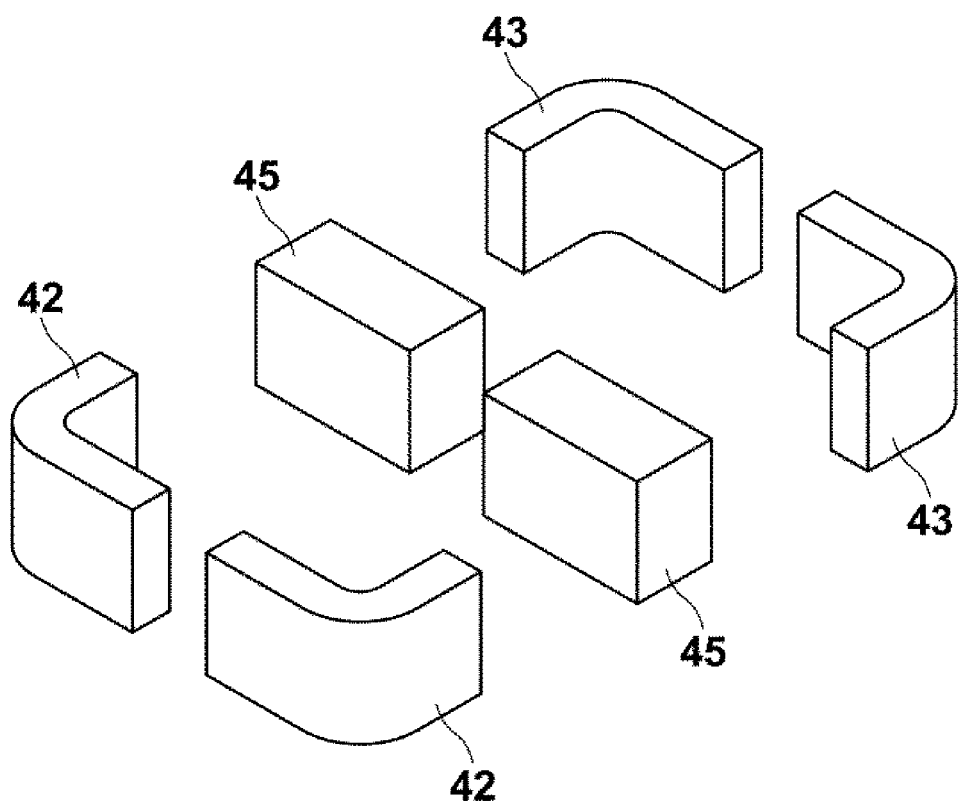
FIG. 3 is a view showing an example of an ELI core according to an embodiment of the inventive concept.
Figure 4:
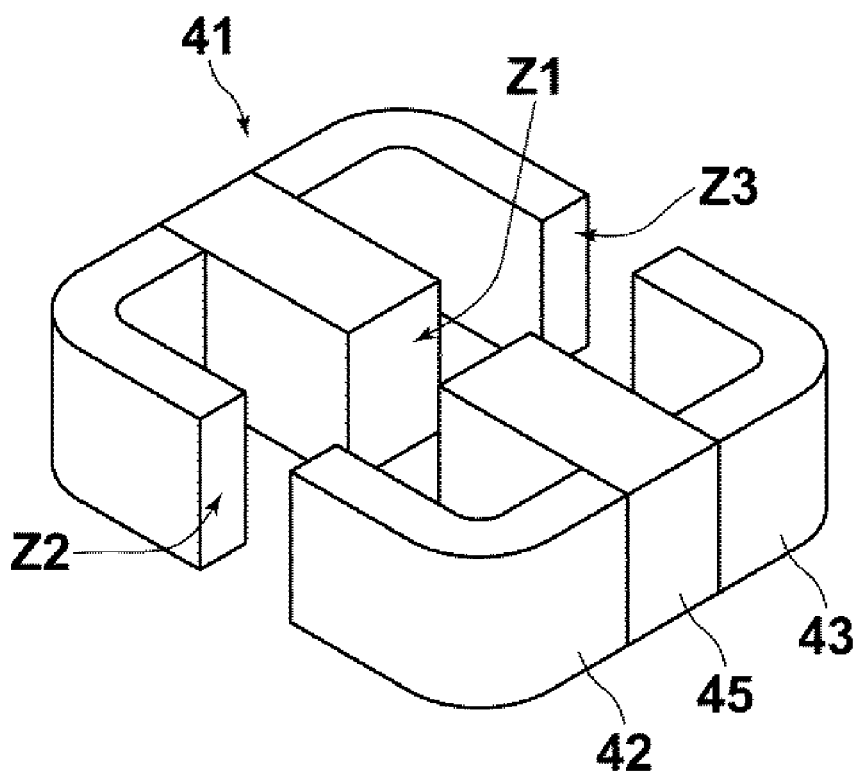
FIG. 4 is a view showing an example of the ELI core according to one embodiment of the inventive concept.
Figure 7:
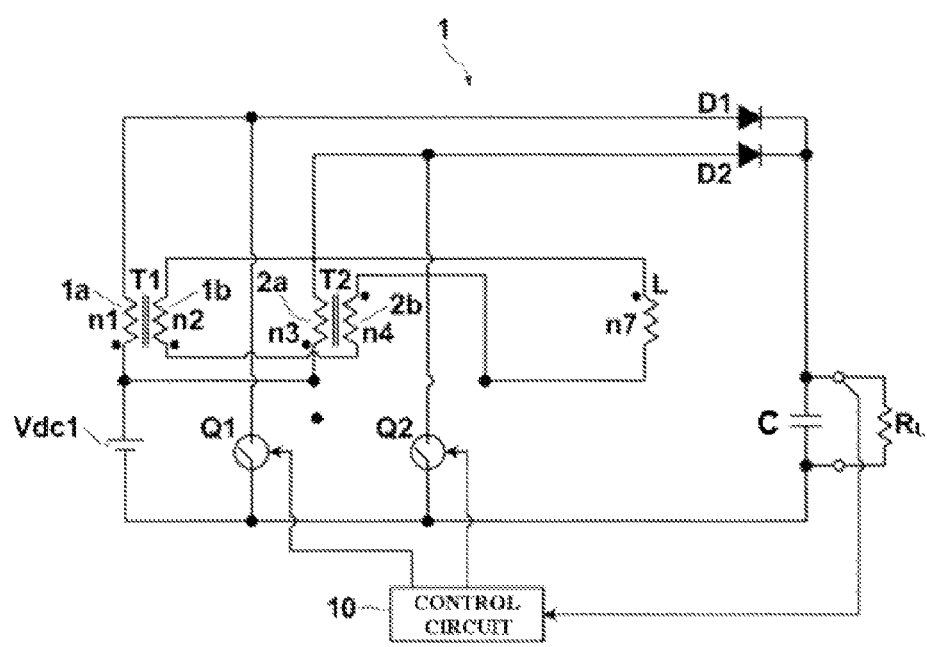
FIG. 7 is a circuit diagram showing one example of a DC/DC converter in an embodiment of the inventive concept.

The power converting apparatus (e.g., power converting apparatus 1 such as shown in FIG. 7 and/or FIG. 8) may include a core (e.g., ELI core 41 such as shown in FIG. 3 and FIG. 4) formed of a magnetic material and a winding wound on a predetermined position on the core to operate in a two-phase mode. The ELI core 41 may include I-shaped block cores, each being made of a magnetic material. The ELI core 41 may include E-shaped cores, each being produced by combining two L-shaped magnetic materials to each of the I-shaped cores. In each of the E-shaped cores, the block core is defined as a central leg 45 and the other two legs are defined as a first outside leg 42 and a second outside leg 43, respectively. Two E-shaped cores are combined such that respective central legs 45 in the two E-shaped cores, respective first outside legs 42 therein, and respective second outside legs 43 therein, are caused to face each other. In other words, one of the respective central legs 45 is caused to face the other of the central legs 45, one of the respective first outside legs 42 is caused to face the other of the first outside legs 42, and one of the respective second outside legs 43 is caused to face the other of the second outside legs 43, respectively. A closed magnetic path is configured by the first outside leg 42 and the second outside leg 43 opposed to the first outside leg relative to the central leg 45.

Further, as shown in FIG. 4, the ratio of the sectional area Z1 of the central leg 45, the sectional area Z2 of the first outside leg 42, and the sectional area Z3 of the second outside leg 43 may be set to 2:1:1. Accordingly, given that the above-described EC core outputs the desired power, size reduction can be achieved while similar power can be outputted by the ELI core even if the sectional area of the central leg of the ELI core and the sectional area of the central leg of the EC core are the same, and the sectional area of the outside leg of the ELI core is half of the sectional area of the outside leg of the EC core (the sectional areas of the central leg of the EC core and the outside leg of the EC core are the same).

Further, the ratio of the sectional area Z1 of the central leg 45, the sectional area Z2 of the first outside leg 42, and the sectional area Z3 of the second outside leg 43 may be set to X:1:1, where (1<X≤2).

Further, the block core may be produced by stacking rectangular magnetic materials one on another.

Figure 5:
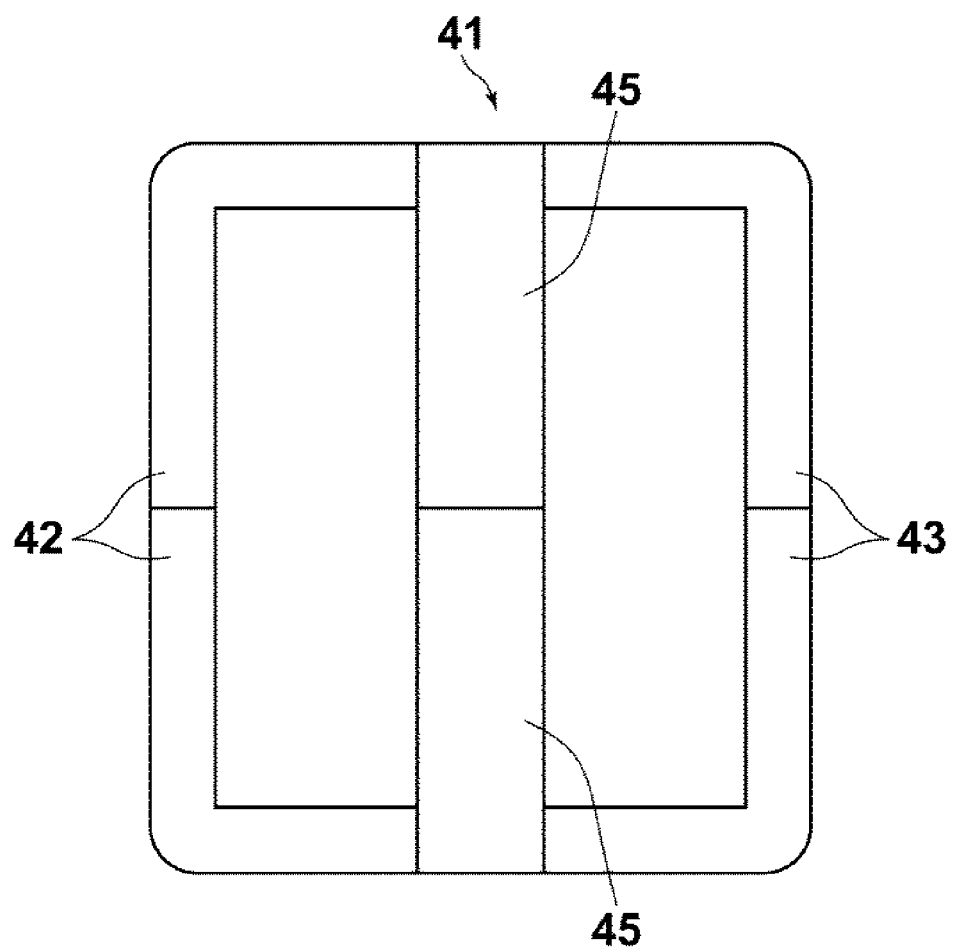
FIG. 5 is a plan view of the ELI core according to the embodiment of the inventive concept.

The L-shaped core of the power converting apparatus of the inventive concept may be produced by cutting a rectangular cylindrical magnetic material part, which is configured by winding a strip-shaped magnetic material made of a silicon steel sheet, into four pieces, each having the same size and formed into an L shape. As shown in FIG. 5, the ELI core can be easily produced by combining the L-shaped cores and the I-shaped cores.

Therefore, a complicated manufacturing process of combining the C-shaped core members to produce the E-shaped core members, preparing two of the E-shaped core members, coupling the two E-shaped core members prepared so as to face each other, and surrounding the peripheries of the coupled E-shaped core members by large C-shaped core members, like the EC core described above, is not required.

Figure 1:
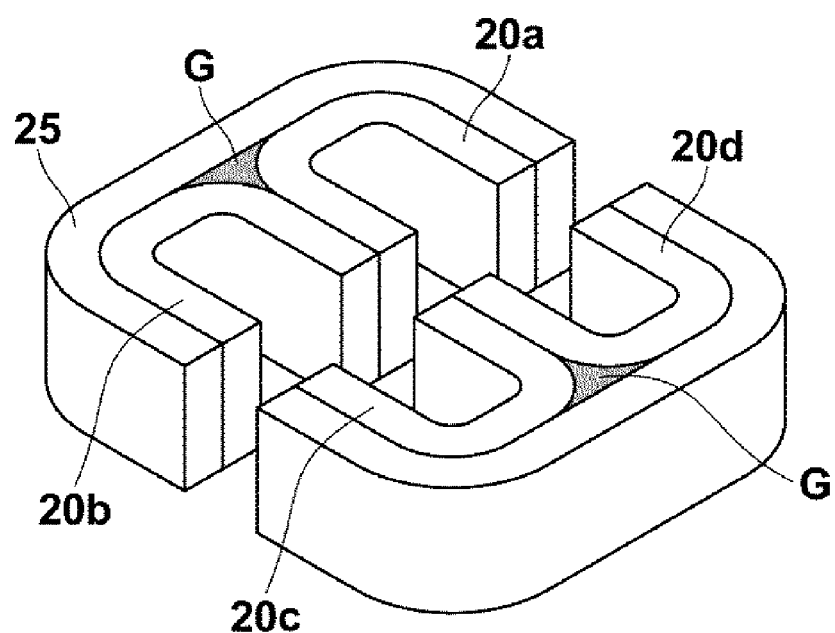
FIG. 1 is a view showing one example of an EC core according to an example in a conventional art.
Figure 2:
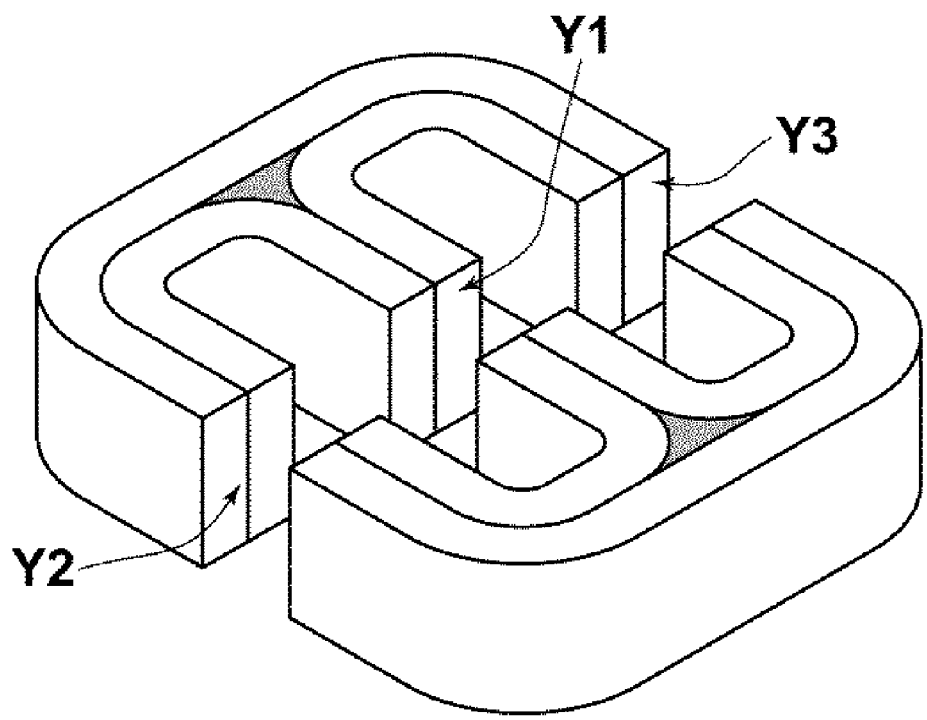
FIG. 2 is a view showing one example of the EC core according to an example in the conventional art.

Incidentally, an air gap may occur in the central leg portion of the ELI core. However, in the EC core, such a gap G as shown in FIG. 1 occurs as a design of manufacture, and as a result, a gap of flux loss occurs, and core loss occurs. But in the case of such an ELI core as shown in FIGS. 3, 4 and 5, such a gap does not occur so that core loss hardly occurs.

Figure 6A:
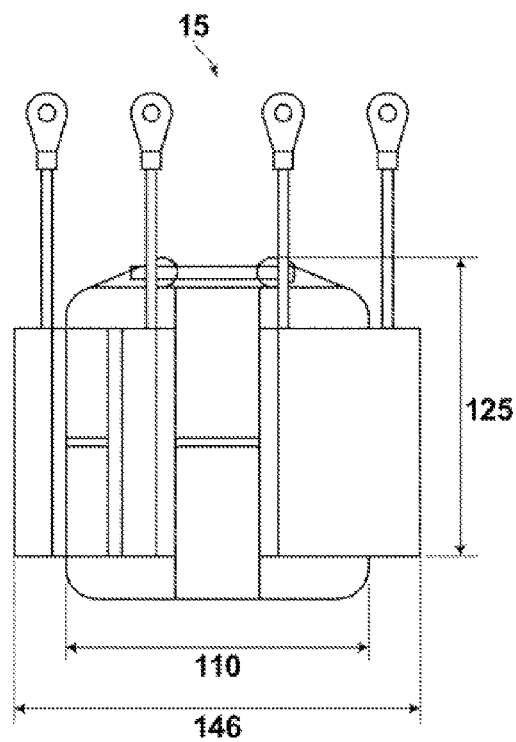
FIGS. 6A and 6B are a front view and a right side view, respectively, of a core unit according to an embodiment of the inventive concept.
Figure 6B:
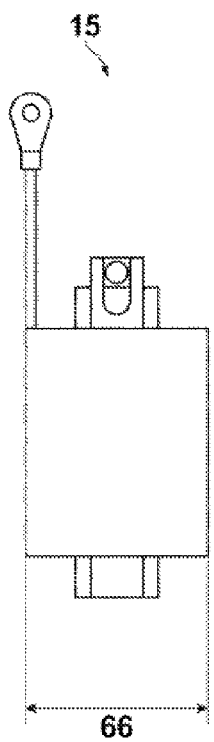

FIGS. 6A and 6B are a front view and a right side view, respectively, of a core unit where windings have been wound on a core of the power converting apparatus of the inventive concept and which is connected with terminals.

Power of about 60 kW may be generated by a core unit 15 shown in FIGS. 6A and 6B. Windings of the core unit 15 may be made of copper wires, or they may be ones on which a strip-shaped copper is wound, as shown in FIGS. 6A and 6B. The windings may have the same number of turns.

First, a DC/DC converter of a booster type, which is one example of the power converting apparatus of the inventive concept, will be described. FIG. 7 shows the DC/DC converter.

In one embodiment of the inventive concept, a DC/DC converter using an ELI core will be described. An insulation type DC/DC converter of this embodiment has two reactors T1 and T2, where a converter output is synthesized by the respective reactors. Size reduction of an inductor portion functioning as an energy accumulating element is achieved by doubling the frequency of the converter output to apply the same to the inductor portion.

Further, by combining the inductor portion functioning as the energy accumulating element by the reactors, it is possible to integrate cores into one piece. Further, it is possible to superimpose inductor current components of respective phases within the energy accumulating element to reduce a ripple width, and it is also possible to reduce the size of the core itself.

An output voltage of a DC power source Vdc1 is boosted to a predetermined voltage. First ends (i.e., winding starting ends) of primary windings of two reactors T1 and T2 are connected to a positive electrode of the DC power source Vdc1, respectively. It is assumed that the first and the second reactors T1 and T2 have the same or similar configuration. The first reactor T1 has a primary winding 1a and a secondary winding 1b. A first switching element Q1 is connected between the other end of the primary winding 1a and a negative electrode of the DC power source Vdc1. Various switching elements such as a MOSFET, or the like, can be used as the switching element. The second reactor T2 has a primary winding 2a and a secondary winding 2b, and a second switching element Q2 is connected between the other end of the primary winding 2a and the negative electrode of the DC power source. The switching elements Q1 and Q2 may be sequentially on/off-controlled with a phase difference of ½ cycle by a control circuit 10.

In one embodiment of the inventive concept, an inductor portion L is connected between the secondary winding 1b of the first reactor T1 and the secondary winding 2b of the second reactor T2. The secondary windings 1b and 2b of the first and second reactors T1 and T2, respectively, and the inductor portion L are connected in series so as to form a closed loop.

A series circuit of a diode D1 and a smoothing capacitor C is connected between the primary winding 1a of the first reactor T1 and the negative electrode of the DC power source Vdc1. A series circuit of a diode D2 and the smoothing capacitor C is connected between the primary winding 2a of the second reactor T1 and the negative electrode of the DC power source. A load RL is connected in parallel with the smoothing capacitor C.

The first reactor T1, the first diode D1, and the smoothing capacitor C constitutes a first converter. The second reactor T2, the second diode D2 and the smoothing capacitor C constitutes a second converter.

Figure 8:
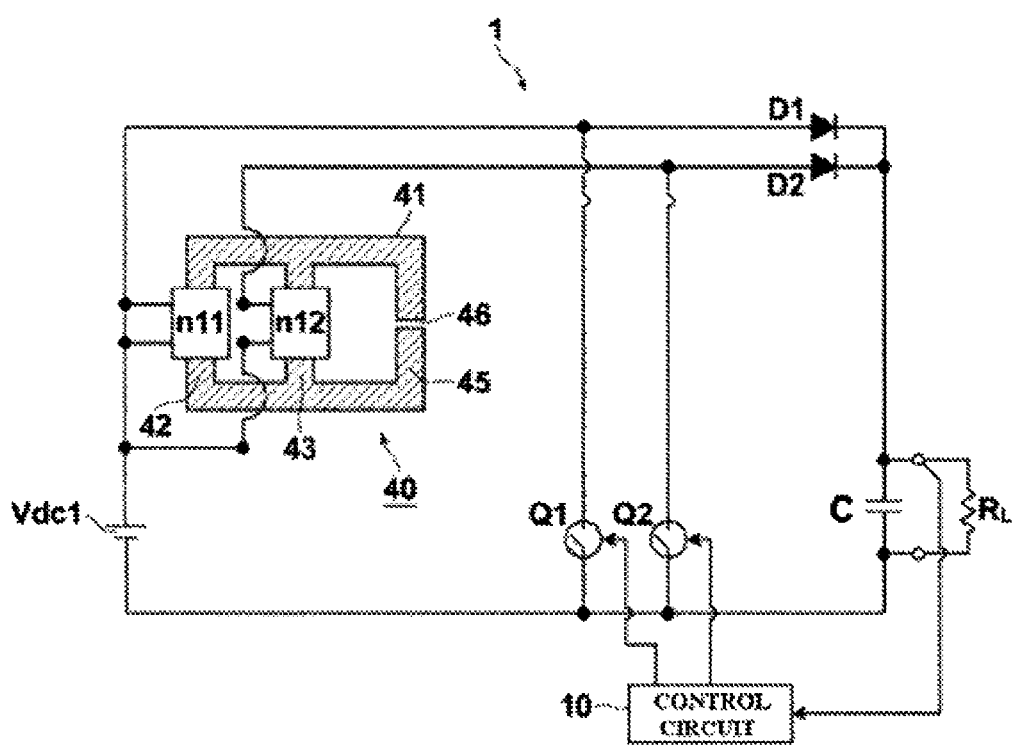
FIG. 8 is a circuit diagram showing one example of a DC/DC converter having a magnetic circuit in an embodiment of the inventive concept.

FIG. 8 is a diagram showing one example of a DC/DC converter having a magnetic circuit according to embodiments of the inventive concept. Incidentally, the same or similar constituent elements as those used in FIG. 7 may be included in FIG. 8 with same reference numerals and explanation is made. A DC voltage of the DC power source Vdc1 is boosted. A magnetic circuit 40 may include a single core 41 constituting a closed magnetic path. The core 41 may include first to third legs 42, 43 and 45 A primary winding n11 is wound on the first leg 42 (i.e., an outside leg) and a second winding n12 is wound on the second leg 43 (i.e., an outside leg). An air gap 46 may be formed in the third leg 45 (i.e., a central leg).

Further, an arrangement position of the third leg in which the air gap is formed can be set between the first leg and the second leg. Incidentally, such a configuration can be adopted in which the air gap is not formed.

Respective first ends of the first and second windings n11 and n12 are connected to the positive electrode of the DC power source Vdc1, respectively, and the respective other ends thereof are connected to the negative electrode of the DC power source via the switching elements Q1 and Q2, respectively. A first series circuit of a diode D1 and a smoothing capacitor C is connected between the other end of the primary winding n11 and the negative electrode of the DC power source. A second series circuit of a diode D2 and the smoothing capacitor C is connected between the other end of the second winding n12 and the negative electrode of the DC power source. A load RL is connected in parallel with the smoothing capacitor C.

The primary winding n11, the first diode D1, and the smoothing capacitor C constitute a first converter. The second winding n12, the second diode D2, and the smoothing capacitor C constitutes a second converter.

The first and second switching elements Q1 and Q2 may be sequentially driven by driving pulses sequentially supplied from the control circuit 10.

Since the two-phase mode DC/DC converter uses a composite magnetic circuit composed of a single core having three legs instead of two reactors and one inductor portion, a further size-reduced DC/DC converter can be realized.

In the above-described two-phase mode DC/CD converter, the cores can be integrated into one by performing connection of the inductor portion, which is the energy accumulating element, by using the reactors. Moreover, inductor current components of the respective phases can be superimposed within the energy accumulating element, so that the ripple width can be reduced and the size of the core itself can be reduced.

Figure 9:
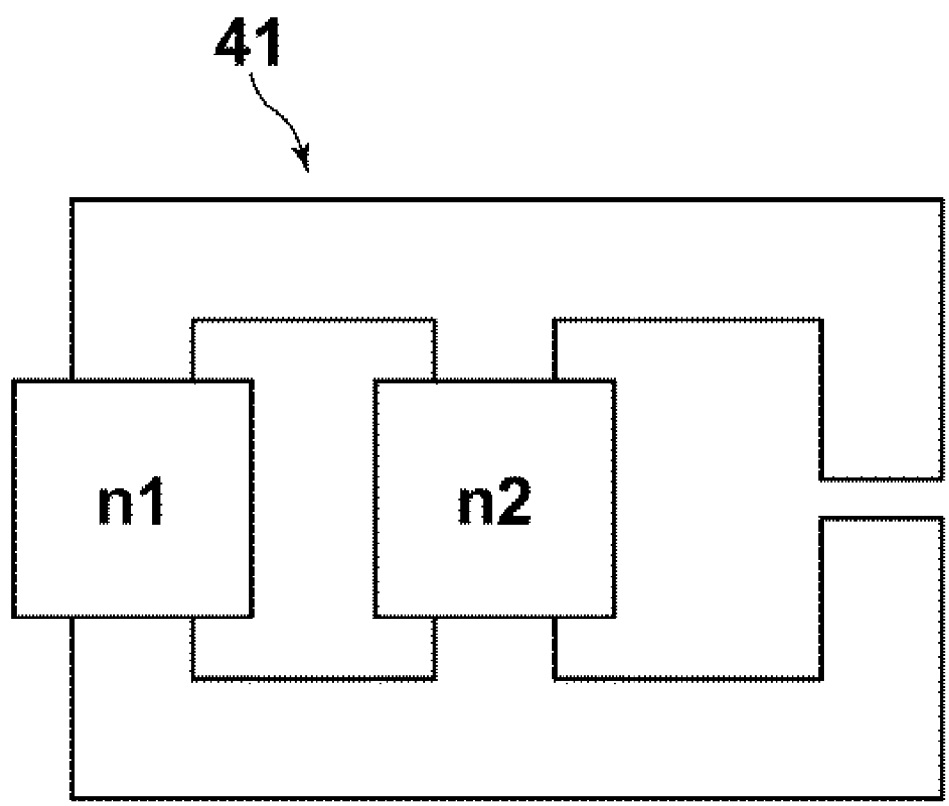
FIG. 9 is a diagram showing one example of a core shape in an embodiment of the inventive concept.

FIG. 9 shows the above-described magnetic circuit 40 shown in FIG. 8 in a state where the magnetic circuit 40 has been simplified into a core shape for easy understanding. In the simplified figure, the primary winding n11 is represented as n1 and the secondary winding n12 is represented as n2.

Thus, for example, in one embodiment of the inventive concept, switching at a high frequency such as about 10 kHz (e.g., between about 8 to 12 kHz) can be performed by using the power converting apparatus having sizes of the core unit 15 shown in FIGS. 6A and 6B.

Embodiments of the inventive concept are not limited to only the above-described embodiments, but it may be variously changed or modified.

Further, the power converting apparatus explained according to the embodiments of the inventive concept can be mounted on at least one of an electric vehicle, a loading shovel, a bulldozer, a robot, a solar generator, an engine driven generator, a large capacity power source, and/or a medical equipment, or the like. Embodiments of the inventive concept make it possible to reduce these apparatuses in size and weight and it is made possible to reduce the cost owing to power supply of a large capacity. As a result, further contribution to reduction of $CO_2$ is achieved as compared with the conventional system.

As described above, the power converting apparatus of the inventive concept is a power converting apparatus, which is composed of a core made of a magnetic material and a winding wound at a predetermined position on the core to operate in a two-phase mode. The core may include: I-shaped block cores, each being made of a magnetic material; and E-shaped cores, each being produced by combining two L-shaped magnetic materials to each of the I-shaped block cores. In each of the E-shaped cores, the block core is defined as a central leg, the other two legs are defined as a first outside leg and a second outside leg, respectively. Two E-shaped cores are combined such that one of respective central legs in the two E-shaped cores, one of respective first outside legs therein, and one of respective second outside legs therein are caused to face the other of the central legs, the other of the first outside legs, and the other of the second outside legs, respectively. Moreover, a closed magnetic path is configured by the first outside leg and the second outside leg opposed to the first outside leg relative to the central leg.

Further, the power converting apparatus of the inventive concept is one for boosting an output voltage of a DC power source, and including a composite magnetic circuit composed of a core constituting a closed magnetic path, two windings which are wound on outside legs of the core, respectively, first ends of the windings being connected to a positive electrode of the DC power source and the other ends thereof being connected to a negative electrode of the DC power source via switching elements, respectively, two series circuits, each including a diode and a smoothing capacitor, which are connected between the respective other ends of the two windings and the negative electrode of the DC power source, and a control circuit, which sequentially on/off-controls the two switching elements with a phase difference of ½ cycle.

Though the power converting apparatus of the inventive concept has been explained while the DC/CD converter is being exemplified, the power converting apparatus may be an inverter circuit apparatus, or the like. Further, the power converting apparatus of the inventive concept may be a driver circuit for motor driving.

Further, the power converting apparatus of the inventive concept may be an inverter circuit apparatus. In addition, the power converting apparatus of the inventive concept may be one which is mounted on at least one of an electric vehicle, a loading shovel, a bulldozer, a robot, a solar generator, an engine driven generator, a large capacity power source, and/ or a medical equipment, or the like.

As described above, according to the power converting apparatus of the inventive concept, since the core includes: I-shaped block cores, each being made of a magnetic material; and E-shaped cores, each being produced by combining two L-shaped magnetic materials to each of the I-shaped block cores, wherein, in each of the E-shaped cores, the block core is defined as a central leg, the other two legs are defined as a first outside leg and a second outside leg, respectively, and two E-shaped cores are combined such that one of respective central legs in the two E-shaped cores, one of respective first outside legs therein, and one of respective second outside legs therein are caused to face the other of the central legs, the other of the first outside legs, and the other of the second outside legs, respectively, and a closed magnetic path is configured by the first outside leg and the second outside leg opposed to the first outside leg relative to the central leg, a power converting apparatus according to embodiments of the inventive concept has reduced power loss, has a small occupation area, can be reduced in size, and has a core shape whose manufacturing process is made simple.

What is claimed is:

1. A power converting apparatus comprising a core made of a magnetic material and a winding wound at a predetermined position on the core to operate in a two-phase mode, wherein the core includes:
   a plurality of E-shaped cores, each including at least two L-shaped magnetic materials and a I-shaped block core made of a magnetic material, the at least two L-shaped magnetic materials being coupled to the I-shaped block core,
   wherein, in each of the E-shaped cores, the block core is defined as a central leg, wherein two outside legs including the two L-shaped magnetic materials are defined as a first outside leg and a second outside leg, respectively, and wherein the plurality of E-shaped cores are combined such that one of respective central legs in the plurality of E-shaped cores, one of respective first outside legs therein, and one of respective second outside legs therein are caused to face the other of the central legs, the other of the first outside legs, and the other of the second outside legs, respectively,
   wherein a closed magnetic path is configured by the first outside leg and the second outside leg opposed to the first outside leg relative to the central leg, and
   wherein the power converting apparatus is a power converting apparatus for boosting an output voltage of a DC power source, the power converting apparatus comprising:
   at least two reactors, respective primary windings thereof being connected to a positive electrode of a positive power source of the DC power source;
   at least two switching elements, which are connected between the primary windings of the respective reactors and a negative electrode of the DC power source, respectively, and
   an inductor portion, which is connected between a secondary winding of a first reactor of the at least two reactors and a secondary winding of a second reactor thereof;
   at least two series circuits, each including a diode and a capacitor, which are connected between the respective primary windings of the at least two reactors and the negative electrode of the DC power source, respectively, wherein:
   the secondary windings of the at least two reactors and the inductor portion are connected in series so as to form a closed loop,
   the capacitor included in the at least two series circuits corresponds to a single shared smoothing capacitor, and
   the core includes at least two outside legs on which the primary windings of the at least two reactors are wound, and the core includes the central legs.

2. The power converting apparatus according to claim 1, wherein the ratio of the sectional area of the central leg, the sectional area of the first outside leg, and the sectional area of the second outside leg is 2:1:1.

3. The power converting apparatus according to claim 1, wherein the power converter apparatus is a DC/DC converter.

4. The power converting apparatus according to claim 1, wherein the power converter apparatus is an inverter circuit apparatus.

5. The power converting apparatus according to claim 4, wherein the power converting apparatus is mounted on at least one of an electric vehicle, a loading shovel, a bulldozer, a robot, a solar generator, an engine driven generator, a large capacity power source, or a medical equipment.

* * * * *